W. S. SEARLES.
SPECTACLE FRAME.
APPLICATION FILED JULY 26, 1917.
1,284,935.
Patented Nov. 12, 1918.
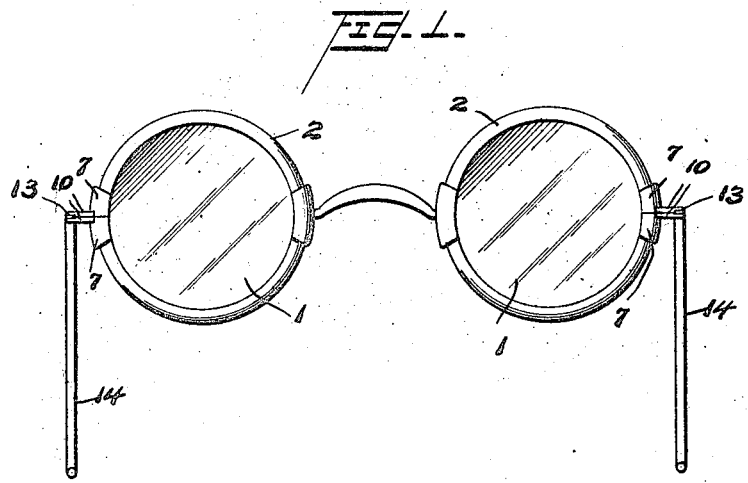
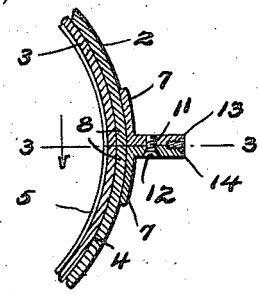
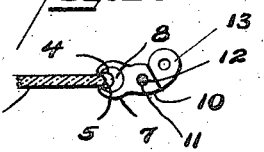
Inventor
Wayne S. Searles
By Cyrus N. Anderson
Attorney

UNITED STATES PATENT OFFICE.

WAYNE S. SEARLES, OF NEWARK, NEW JERSEY, ASSIGNOR TO NEW JERSEY OPTICAL CO., OF NEWARK, NEW JERSEY, A CORPORATION OF NEW JERSEY.

SPECTACLE-FRAME.

1,284,935.

Specification of Letters Patent.

Patented Nov. 12, 1918.

Application filed July 26, 1917. Serial No. 182,851

*To all whom it may concern:*

Be it known that I, WAYNE S. SEARLES, a citizen of the United States, and a resident of Newark, county of Essex, State of New Jersey, have invented certain new and useful Improvements in Spectacle-Frames, of which the following is a specification.

My invention relates to spectacle frames, more particularly those of the character in which the rims for the lenses comprise a combination of metallic and non-metallic material, such as xylonite or equivalent material.

One of the specific objects of my invention is to provide an improved construction of connection between the rims of the character mentioned and the temples.

It is quite a usual practice to employ clips for connecting the temples of spectacle frames to the rims for the lenses and it is one of the objects of my invention to so attach these clips to the opposing abutting ends of these rims that the metallic and non-metallic portions of the latter are firmly secured together.

A further object is to connect the clips to the rims without the employment of fastening screws or other like means.

Another object of my invention is to provide a construction which may be manufactured more cheaply and economically than other like previous constructions.

In order that my invention may be more readily understood and its practical advantages fully appreciated reference should be had to the accompanying drawing in which I have illustrated a convenient form of embodiment thereof and in which:

Figure 1 is a view in front elevation of a pair of spectacles in which the frame is constructed in accordance with my invention;

Fig. 2 is a sectional view through a portion of the frame embodying my invention, said view being taken in a plane centrally of and in the plane of a lens rim; and Fig. 3 is a section taken on the line 3—3 of Fig. 2.

Referring to the drawing, 1 designates the lenses of a pair of spectacles, which lenses are supported in the rims of the spectacle frame. The said rims comprise the outer portions 2 of non-metallic material such as xylonite or equivalent material, and the inner portions 3 of metal, the latter being seated or rested in an inner groove 4 of the outer non-metallic rim portion 2. The inner rim element or portion 3 of the rim is provided with the usual groove 5 in which the peripheral edge of a lens is seated.

7 designates the gripping or clamping portions of clips which extend around the peripheral and side surface portions of the opposing end portions of the non-metallic part or element 2 of the rim. Such gripping or clamping portions 7 are clamped and compressed about the end portions 8 of the element 2 of a rim so as to clamp and grip the same firmly against the corresponding opposing end portions of the inner metallic portion or element 3 of the rim 1.

In the act of compressing the clamping portions 7 of the clips against and partially around the end portions 8 of the non-metallic portions 2 of the rim the inner edges of the said end portions 8 are forced well around and against the opposite side edges of the corresponding portions of the inner metallic part or element 3 of the rim, as is clearly indicated in Fig. 3 of the drawing.

It will be seen, therefore, that the clips are not only secured to the rims without the employment of screws or like fastening devices but that the said clips operate to securely fasten together the overlying or nesting end portions of the inner and outer rim elements or members.

10 designates studs projecting outwardly from the clamping parts 7 of the clips which studs are provided with openings 11, one of which is screw threaded to receive the screw threaded end of a screw 12 by means of which opposing clips are drawn together and secured so as to hold the opposing ends of the rims in contact or in close relation to each other. Spaces 13 are provided intermediate the outer ends of the projections or studs 10 for the reception of the inner ends of the temples 14. Such temples are pivotally secured in these spaces by means of pivots which extend in known manner through the outer ends of the said projections or studs 10 and the front ends of the temples 14.

I claim:—

1. In a spectacle frame, the combination of a rim for a spectacle lens, said rim comprising an inner metallic part for engaging the edge of the lens, an outer non-metallic part having a groove in its inner peripheral edge within which said metallic part is seated and temple connecting clips respectively having clamping parts in clamping engagement with the adjacent opposing end portions of the said non-metallic part and clamping the latter against the corresponding portions of said metallic part, substantially as described.

2. In spectacle frames, the combination of rims for the spectacle lenses, the said rims respectively comprising non-metallic and metallic parts, the latter being seated within a groove in the inner peripheral edges of the non-metallic parts, said metallic parts being provided with means upon their inner peripheral edges for engaging the lenses of the spectacles, the opposite ends of the said parts of the respective rims being adjacent and in opposed relation to each other, clips having clamping parts in clamping engagement with opposing end portions of each of the said rims for securing the parts of the said rims together and means for connecting the said clips with each other whereby the opposing ends of each of the rims are secured together, substantially as described.

3. In spectacle frames, the combination of rims respectively comprising non-metallic and metallic parts, the non-metallic parts being provided with grooves in their inner peripheral edges in which the metallic parts are seated, the said metallic parts being provided with grooves in their inner peripheral edges for the reception of the edges of the spectacle lenses, clips having clamping means in engagement with opposing end portions of each of the said rims, said clamping portions clamping together the overlying end portions of the two parts of each of the rims and means for securing the said clips together, substantially as described.

In testimony that I claim the foregoing as my invention, I have hereunto signed my name this 24 day of July, A. D. 1917.

WAYNE S. SEARLES.